(12) United States Patent
Mueller

(10) Patent No.: US 7,298,946 B2
(45) Date of Patent: Nov. 20, 2007

(54) MULTI-FIBER CABLE FOR EFFICIENT MANAGEABILITY OF OPTICAL SYSTEM

(75) Inventor: Juergen Mueller, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 239 days.

(21) Appl. No.: 11/020,582

(22) Filed: Dec. 22, 2004

(65) Prior Publication Data
US 2006/0133747 A1 Jun. 22, 2006

(51) Int. Cl.
*G02B 6/44* (2006.01)
*G02B 6/36* (2006.01)

(52) U.S. Cl. .............. 385/100; 385/109; 385/113; 385/76; 385/77; 385/78

(58) Field of Classification Search .......... 385/100, 385/102, 107, 109, 113, 134, 53, 76, 77–78
See application file for complete search history.

(56) References Cited

U.S. PATENT DOCUMENTS

| | | | |
|---|---|---|---|
| 5,519,695 A | 5/1996 | Purohit et al. | |
| 6,607,308 B2 | 8/2003 | Dair et al. | |
| 6,614,968 B1* | 9/2003 | Eslambolchi et al. | 385/100 |
| 6,625,375 B1* | 9/2003 | Mahony | 385/135 |
| RE38,311 E | 11/2003 | Wheeler | |
| 6,674,951 B1 | 1/2004 | Erwin et al. | |
| 6,711,339 B2 | 3/2004 | Puetz et al. | |
| 6,751,383 B2 | 6/2004 | Um et al. | |
| 6,760,523 B2 | 7/2004 | Nechitailo | |
| 6,788,846 B2 | 9/2004 | Hileman et al. | |
| 6,906,505 B2* | 6/2005 | Brunet et al. | 324/66 |
| 2006/0093282 A1* | 5/2006 | Shepherd et al. | 385/90 |

\* cited by examiner

*Primary Examiner*—Frank G. Font
*Assistant Examiner*—Michael P. Mooney

(57) ABSTRACT

One embodiment disclosed relates to a manufactured multi-fiber cable for optical systems. The multi-fiber cable is manufactured to include a plurality of individual fiber cables, each individual fiber cable including a single optical fiber surrounded by a protective covering. There is a main cable hose around the individual fiber cables, and there is a connector on each end of each individual fiber cable. The individual fiber cables in the multi-fiber cable are preconfigured to be visually distinct from each other. Other embodiments are also disclosed.

14 Claims, 4 Drawing Sheets

Fiber Channel Architecture
(Conventional)

MULTI-FIBER CABLE FOR EFFICIENT MANAGEABILITY OF OPTICAL SYSTEM

BACKGROUND OF THE INVENTION

1. Field of the Invention

The present invention relates to fiber optics, including fiber optics used in Fiber Channel interconnections and other interconnections.

2. Description of the Background Art

Optical fibers are used in various systems. For example, Fiber Channel systems use optical fibers. The Fiber Channel standard was developed and adopted by the American National Standard for Information Systems (ANSI). Briefly, Fiber Channel is a switched protocol that allows concurrent communication among servers, workstations, and various peripherals.

FIG. 1 depicts a block diagram of a representative Fiber Channel architecture. A Fiber Channel network 100 is presented. Systems such as a workstation 120 and servers 122 are interconnected with various subsystems (for example, a tape subsystem 126, a disk subsystem 128, and a display subsystem 130) via a Fiber Channel fabric 110.

The Fiber Channel fabric 110 is a system that interconnects various node ports (N_ports) attached to the fabric 110. The fabric 110 receives frames of data from a source node port and, using a Fiber Channel protocol, route the frames to a destination node port. In a preferred embodiment, the first protocol is the Fiber Channel protocol. Similar protocols, such as the a synchronous transfer mode (ATM), may be used in other similar embodiments.

Each of the various systems (for example, server 122) and subsystems (for example, disk subsystem 128) connected to the Fiber Channel fabric 110 includes an associated node port 140. Each node port comprises a hardware communication device at the node end of a link.

The fabric ports (F_ports) 142 are access points of the fabric 110 for physically connecting the various node ports 140. The fabric 110 has the capability of routing data frames based upon information contained within the frames as specified by a class of service. The node port 140 typically manages the point-to-point connection between itself and the fabric 110.

Interconnections between the node ports 140 and fabric ports 142 typically include fiber optic cables. As the use of fiber optics has grown in Fiber Channel systems and other systems, a need for fiber management techniques has arisen.

It is desirable to improve the management of fiber optics used in Fiber Channel systems and in other systems.

SUMMARY

One embodiment of the invention pertains to a manufactured multi-fiber cable for optical systems. The multi-fiber cable is manufactured to include a plurality of individual fiber cables, each individual fiber cable including a single optical fiber surrounded by a protective covering. There is a main cable hose around the individual fiber cables, and there is a connector on each end of each individual fiber cable. The individual fiber cables in the multi-fiber cable are preconfigured to be visually distinct from each other.

Another embodiment pertains to a manufactured multi-fiber cable for Fiber Channel systems that includes a plurality of individual fiber cables, a main cable hose around the individual fiber cables, a protective reinforcement along the main cable hose, a connector on each end of each individual fiber cable, labels that are thermally attached to each end of the individual fiber cables during manufacture of the multi-fiber cable, and labels that are thermally attached to each end of the main cable hose during manufacture of the multi-fiber cable. Distinctive colors are used on the coverings of the individual fiber cables so as to provide said visual distinctness between the individual fiber cables of the multi-fiber cable. The individual fiber cables each comprise a single optical fiber surrounded by a covering, and the individual fiber cables extend outward past the main cable hose by less than one meter. Each connector comprises a precision ceramic ferrule.

Another embodiment of the invention pertains to a Fiber Channel system. The system comprises a fiber channel fabric, including a plurality of fabric ports, and a plurality of node systems, each node system including a node port. The system further comprises a multi-fiber. The multi-fiber cable includes individual fiber cables. Each individual fiber cable connects a node port to a fabric port.

Other embodiments of the invention are also disclosed.

DETAILED DESCRIPTION

Disadvantages and Difficulties with Conventional Techniques

The management of optical fibers presents concerns than were not faced in conventional copper wire systems. For example, consider the management of the multitude of single optical fibers in a typical Fiber Channel system.

A first concern is that optical fibers require significantly greater care than do copper wires, as they cannot be bent sharply, crimped, or twisted. Since optical fibers and their assemblies tend to be expensive, it is desirable to avoid damage to the optical fibers during system installation and maintenance.

A second concern is that determining or verifying identification of individual optical fibers is considerably more difficult than for copper wires. With copper wires, the correspondence between wires at the ends of a long cable may be readily verified, for example, by shorting two wires at one end and checking for connectivity at the other end, or by using inexpensive testing devices. On the other hand, verifying the correspondence between optical fibers at the ends of an optical cable require more complex and expensive test equipment.

For example, today in data centers, numerous single fiber cables are typically used between a server and a Fiber Channel switch (or storage array). A typical set-up may require 100 to 350 single fiber cables. These cables need to be laid very carefully into a raised floor or in overhead trays. During the lay process, the cables are vulnerable to be damaged. In addition, the ends of the individual fiber cables conventionally require laborious manual identification and manual labeling. Debugging errors due to incorrect connections are painstaking.

Solutions Provided by the Present Disclosure

The present disclosure provides solutions to the above-discussed problems. By using the multi-fiber cable configured as disclosed herein, labor to lay the fiber cables is minimized. Hence, higher quality work is achievable at a faster rate when laying the fiber cables.

Specific Embodiments

In accordance with an embodiment of the invention, a multi-fiber (multi-string) Fiber Channel cable is disclosed. The multi-fiber Fiber Channel cable may be implemented with two, four, six, eight, or sixteen individual fiber cables per multi-fiber cable. The multiple individual fiber cables are tied together and configured together within a hose to form the multi-fiber cable.

Figure 1:
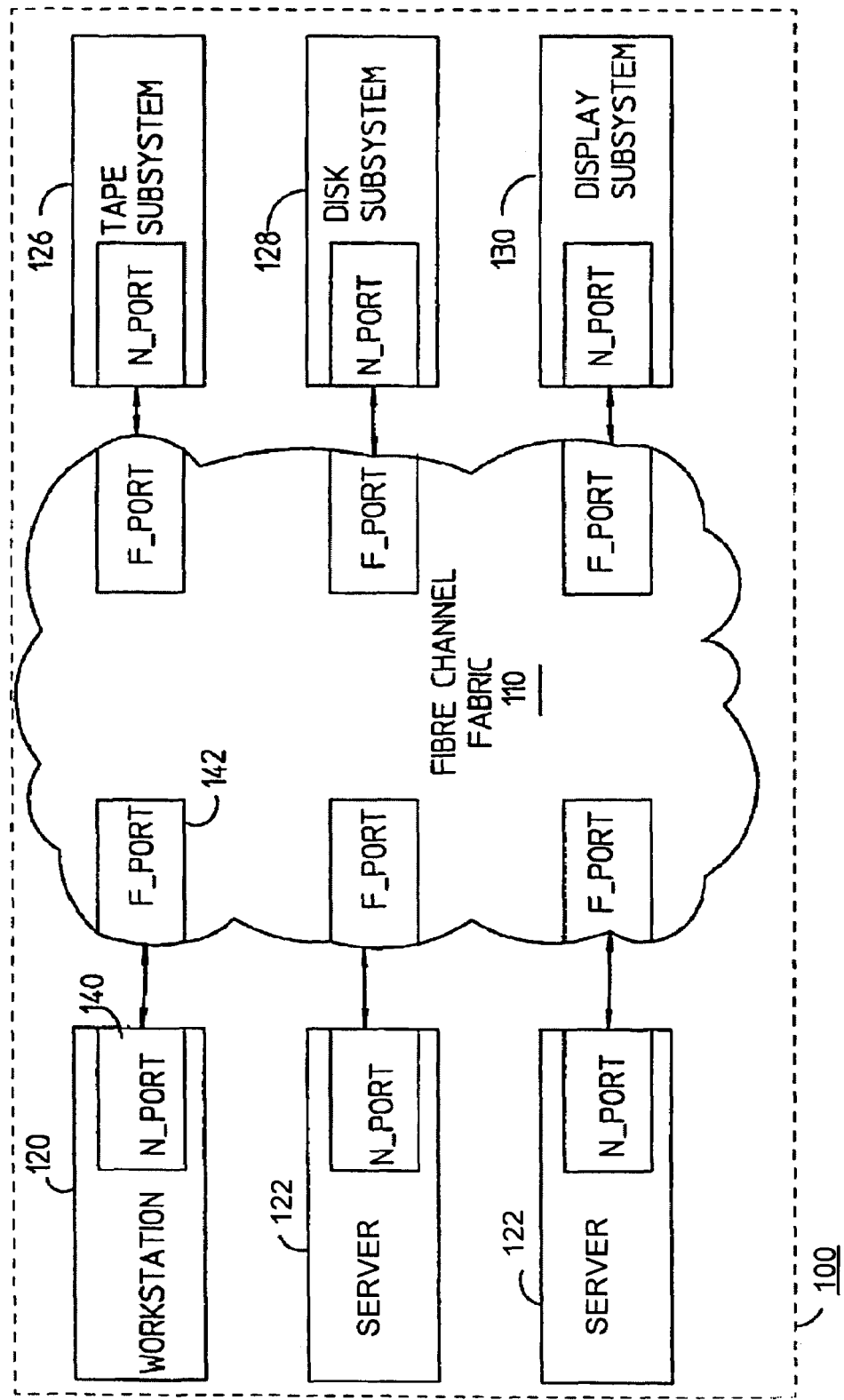
FIG. 1 depicts a block diagram of a representative Fiber Channel architecture.
Figure 2:
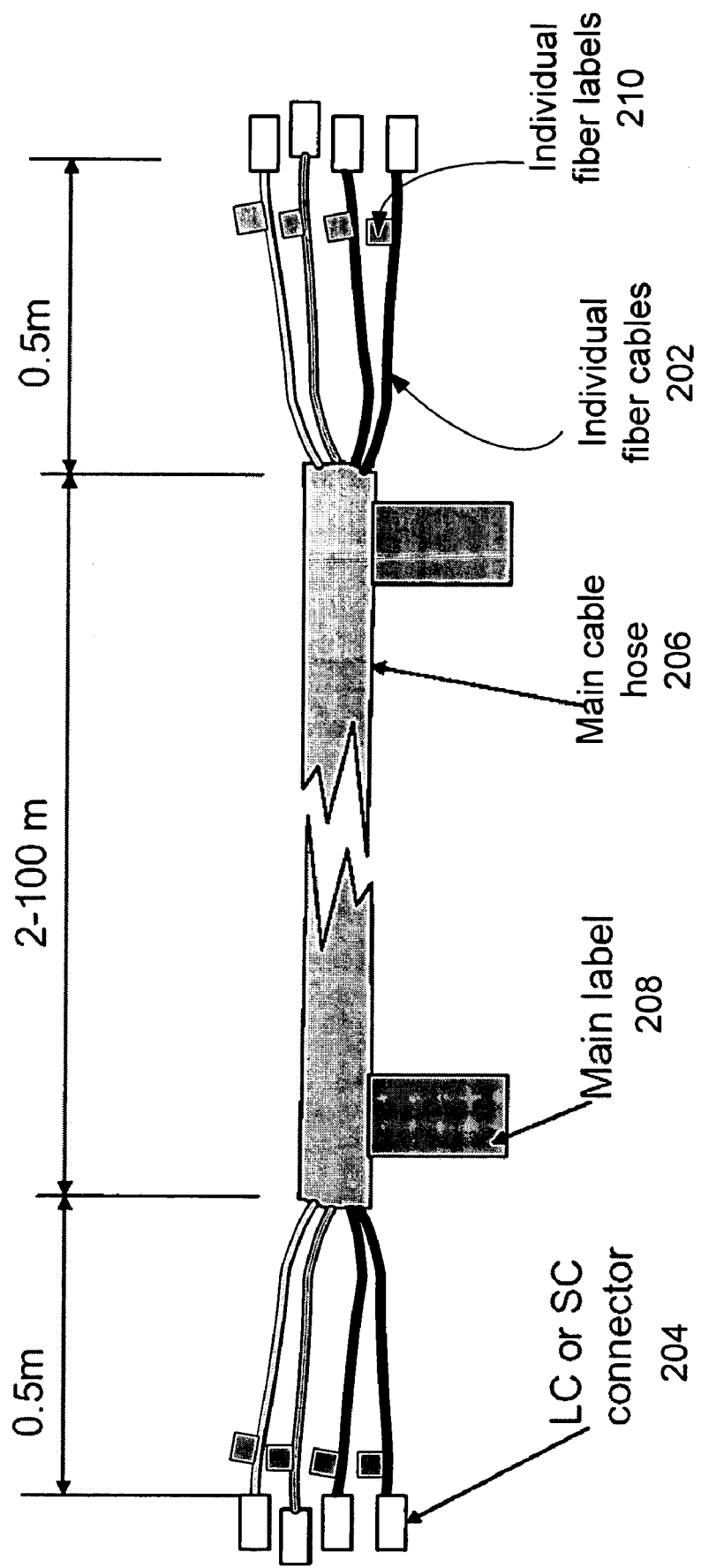
FIG. 2 is a schematic diagram illustrating a multi-fiber cable for efficient manageability in accordance with an embodiment of the invention.

FIG. 2 is a schematic diagram illustrating a multi-fiber cable 200 for efficient manageability in accordance with an embodiment of the invention. The particular cable depicted in FIG. 2 is a four-fiber cable. However, as mentioned above, other multi-fiber cables implemented in accordance with an embodiment of the invention may include other numbers of fibers, such two, four, six, eight, or sixteen individual fiber cables per multi-fiber cable.

The multi-fiber cables are preferably formed in standard lengths. For example, the standard lengths may be two meters, five meters, ten meters, fifteen meters, thirty meters, and one hundred meters. Other standard lengths are possible.

The ends of each individual fiber cable 202 of the multi-fiber cable 200 are configured to extend outside the hose (or wrap or coat) 206 of the main multi-fiber cable 200. Each end of an individual fiber cable 202 is further pre-configured with a connector 204. In a preferred embodiment, the connector 204 is a precision ceramic ferrule, such as an LC connector or an SC connector.

Each individual fiber cable 202 is preferably coated with a protective coating of a unique color and/or pattern. In other words, each individual fiber cable 202 in the multi-fiber cable is individually identifiable by the color and/or the pattern of its outer coating.

In a preferred embodiment, the multi-fiber cable 200 may be constructed with a main label 208 on each end. In addition, each individual (independent) cable 202 may also be constructed with an individual fiber label 210. The labels may be attached, for example, using a thermal transfer process, and the attachment may be performed using an automated label applicator machine.

Figure 3:
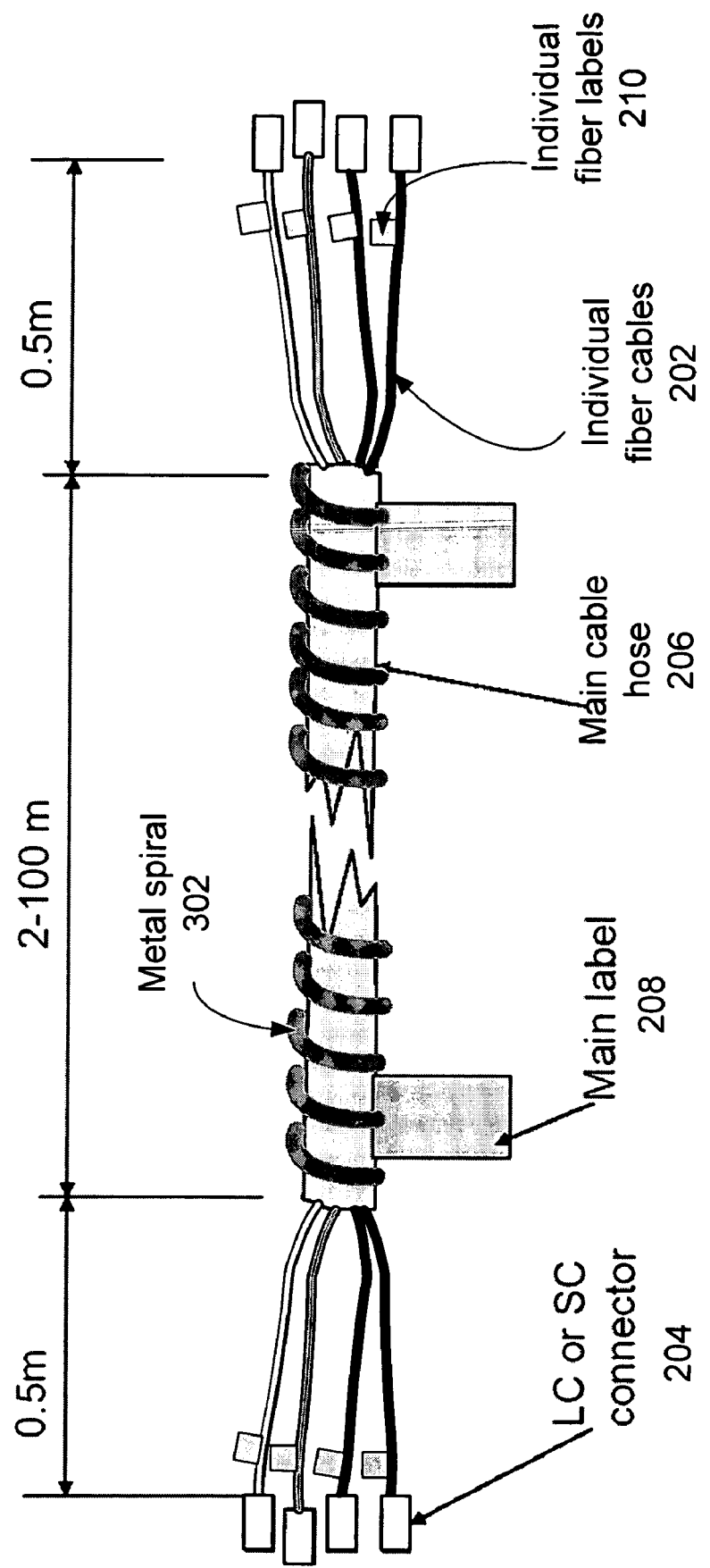
FIG. 3 is a schematic diagram illustrating a multi-fiber cable for efficient manageability with a protective reinforcement in accordance with an embodiment of the invention.

FIG. 3 is a schematic diagram illustrating a multi-fiber cable 300 for efficient manageability with a protective reinforcement in accordance with an embodiment of the invention. The embodiment shown in FIG. 3 is again a 4-fiber cable, but other embodiments would have other numbers of individual cables.

The difference between the multi-fiber cable 300 in FIG. 3 and the multi-fiber cable 200 in FIG. 2 is that an additional protective reinforcement is added. As illustrated, the protective reinforcement may comprise, for example, a metal spiral 302. The metal spiral 302 is depicted as implemented on the outside of the main cable hose 206, but may also be implemented on the inside or embedded within the main cable hose 206.

Advantageously, the protective reinforcement further prevents damage from external forces. For example, the metal spiral 302 may prevent damage from a person stepping on the cable 300 with his or her foot. As another example, the metal spiral 302 may prevent damage from a person strongly bending the cable 300 by limiting the amount of bend inflicted on the cable 300.

Figure 4:
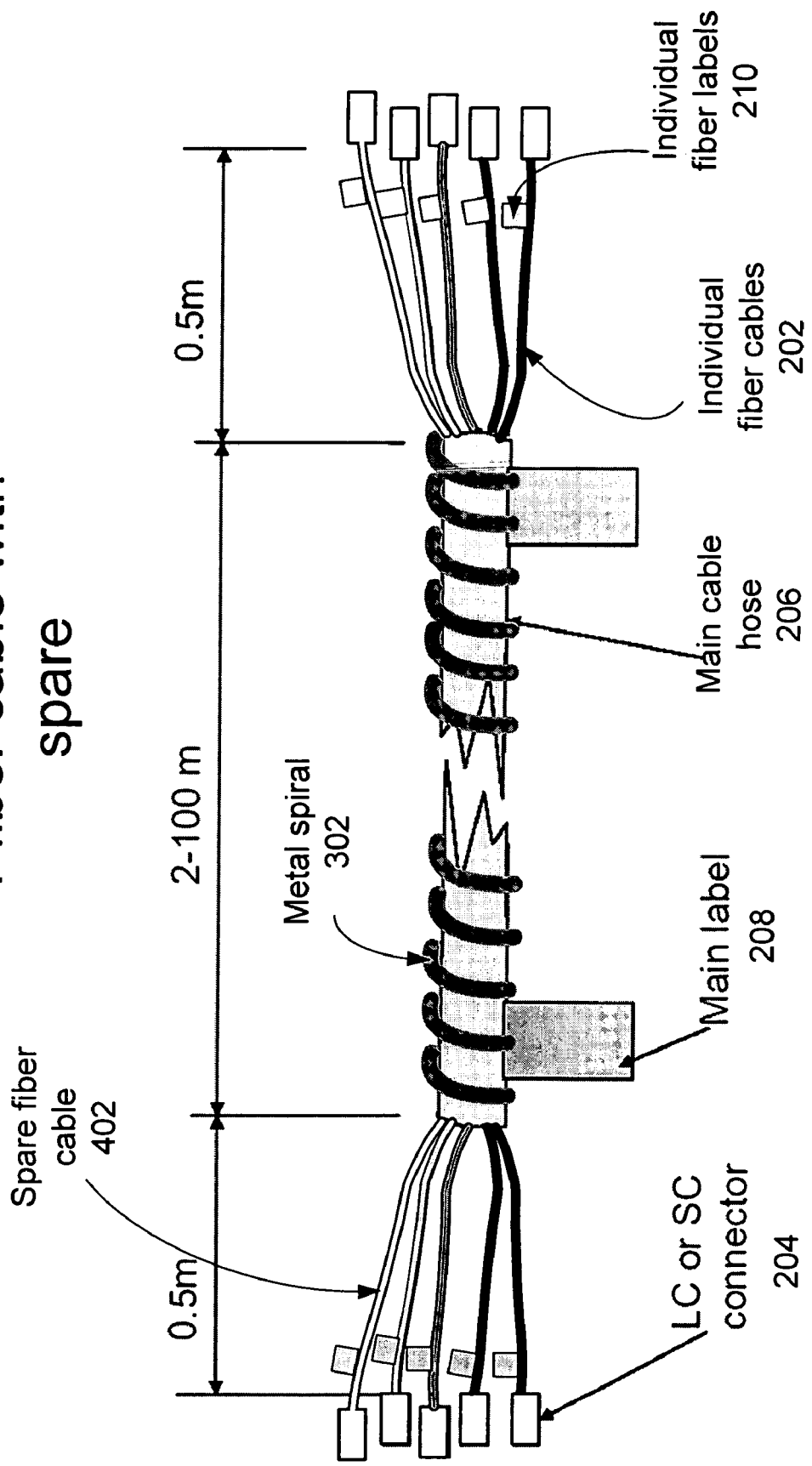
FIG. 4 is a schematic diagram illustrating a multi-fiber cable for efficient manageability with protective reinforcement and a spare fiber cable in accordance with an embodiment of the invention.

FIG. 4 is a schematic diagram illustrating a multi-fiber cable 400 for efficient manageability with protective reinforcement and a spare fiber cable 402 in accordance with an embodiment of the invention. The embodiment shown in FIG. 4 is again a 4-fiber cable, but other embodiments would be designed for other numbers of individual cables.

The difference between the multi-fiber cable 400 in FIG. 4 and the multi-fiber cable 300 in FIG. 3 is that the spare (redundant) fiber cable 402 is added. The spare fiber cable 402 may be conveniently used to make a connection in case one of the other cables (or one of the connectors) has a fault or breaks. The spare cable 402 may also be used if need for an additional connection arises.

Advantages

The present application discloses a multi-fiber cable for efficient manageability of Fiber Channel or other systems. There are various advantages of using the multi-fiber cable as disclosed herein.

First, compared with the conventional technique of laying hundreds of individual cable fibers, using the multi-fiber cables substantially reduces the number of (main) cables to lay. This advantageously reduces labor time required.

Second, using the multi-fiber cables substantially reduces risk of damage to the individual fiber cables. The bundle of individual fiber cables is difficult to bend at a sharp angle, and the main cable hose further protects the individual cable fibers from damage.

Third, the multi-fiber cables (after being laid) are easier to remove. The bundling of the individual fiber cables reduces the number of cables to remove and also reduces the chance of damage to the individual fiber cables. The main cable hose provides an additional protection for the fragile individual fiber cables.

Fourth, the labor required to label the cables is reduced due to the built-in labels. In one embodiment, as depicted in FIG. 2, labels are built-in both on each end of the main cable hose and on each end of the individual fiber cables.

Fifth, trouble shooting is simplified and facilitated using the multi-fiber cable as disclosed herein. The coloring of the individual fiber cables makes it easier to distinguish and identify each independent fiber. In addition, the built-in labeling may be used to further distinguish and identify each main cable and each independent fiber therein.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A manufactured multi-fiber cable for optical systems, the multi-fiber cable comprising:
   a plurality of individual fiber cables, each individual fiber cable including a single optical fiber surrounded by a protective covering;
   a main cable hose around the individual fiber cables; and
   a connector on each end of each individual fiber cable,
   wherein the individual fiber cables in the multi-fiber cable are preconfigured to be visually distinct from each other, and
   wherein distinctive patterns are used on the coverings of the individual fiber cables so as to provide said visual distinctness.

2. The multi-fiber cable of claim 1, wherein labels are attached to each end of the individual fiber cables during manufacture of the multi-fiber cable.

3. The multi-fiber cable of claim 1, wherein labels are attached to each end of the main cable hose during manufacture of the multi-fiber cable.

4. The multi-fiber cable of claim 1, wherein distinctive colors are used on coverings of the individual fiber cables so as to further provide said visual distinctness.

5. The multi-fiber cable of claim 1, wherein the multi-fiber cable is manufactured to be of a standard length.

6. The multi-fiber cable of claim 5, wherein the standard length comprises a length from a group consisting of two meters, five meters, ten meters, fifteen meters, thirty meters, and one hundred meters.

7. The multi-fiber cable of claim 1, wherein the multi-fiber cable consists of a number of individual fiber cables from a group consisting of two, four, six, eight and sixteen individual fiber cables.

8. The multi-fiber cable of claim 1, wherein the individual fiber cables extend outward past the main cable hose by a fraction of a meter.

9. A manufactured multi-fiber cable for optical systems, the multi-fiber cable comprising:
   a plurality of individual fiber cables, each individual fiber cable including a single optical fiber surrounded by a protective covering;
   a main cable hose around the individual fiber cables;
   a connector on each end of each individual fiber cable; and
   a protective reinforcement to the main cable hose,
   wherein the individual fiber cables in the multi-fiber cable are preconfigured to be visually distinct from each other.

10. The multi-fiber cable of claim 9, wherein the protective reinforcement comprises a metal spiral along the main cable hose.

11. A manufactured multi-fiber cable for Fiber Channel systems comprising:
   a plurality of individual fiber cables, wherein each individual fiber cable comprises a single optical fiber surrounded by a covering;
   a main cable hose around the individual fiber cables;
   a protective reinforcement along the main cable hose;
   a connector on each end of each individual fiber cable;
   labels that are thermally attached to each end of the individual fiber cables during manufacture of the multi-fiber cable, and
   labels that are thermally attached to each end of the main cable hose during manufacture of the multi-fiber cable,
   wherein distinctive colors are used on the coverings of the individual fiber cables so as to provide said visual distinctness between the individual fiber cables of the multi-fiber cable,
   wherein the individual fiber cables extend outward past the main cable hose by less than one meter, and
   wherein each connector comprises a precision ceramic ferrule.

12. The multi-fiber cable of claim 11, wherein the multi-fiber cable is manufactured to be of a standard length.

13. The multi-fiber cable of claim 12, wherein the standard length comprises a length from a group consisting of two meters, five meters, ten meters, fifteen meters, thirty meters, and one hundred meters.

14. The multi-fiber cable of claim 11, wherein the multi-fiber cable consists of a number of individual fiber cables from a group consisting of two, four, six, eight and sixteen individual fiber cables plus a spare fiber cable.

* * * * *

UNITED STATES PATENT AND TRADEMARK OFFICE
CERTIFICATE OF CORRECTION

PATENT NO. : 7,298,946 B2  Page 1 of 1
APPLICATION NO. : 11/020582
DATED : November 20, 2007
INVENTOR(S) : Juergen Mueller It is certified that error appears in the above-identified patent and that said Letters Patent is hereby corrected as shown below:

In column 1, line 30, delete "a synchronous" and insert -- asynchronous --, therefor.

Signed and Sealed this

Twenty-seventh Day of May, 2008

JON W. DUDAS
*Director of the United States Patent and Trademark Office*